United States Patent [19]
Dam

[11] Patent Number: 5,735,166
[45] Date of Patent: Apr. 7, 1998

[54] ULTRASONIC MICRO-SENSOR FOR LEVEL LEAK ALERT AND INTERFACE DETECTOR

[75] Inventor: Naim Dam, Muttontown, N.Y.

[73] Assignee: Cosense, Inc., Hauppauge, N.Y.

[21] Appl. No.: 353,833

[22] Filed: Dec. 12, 1994

[51] Int. Cl.$^6$ ................................................ G01F 23/00
[52] U.S. Cl. ................................ 73/290 V; 73/1.73
[58] Field of Search ....................... 73/1 H, 290 V, 73/861.27–29, 861.31, 170.08

[56] References Cited

U.S. PATENT DOCUMENTS

| | | | |
|---|---|---|---|
| 3,825,025 | 7/1974 | Samuel et al. | 73/290 V X |
| 4,299,114 | 11/1981 | Silvermetz et al. | 73/1 H |
| 5,282,388 | 2/1994 | Czajkoski | 73/861.27 X |
| 5,428,984 | 7/1995 | Jones et al. | 73/290 V X |
| 5,452,611 | 9/1995 | Jones et al. | 73/1 H X |

FOREIGN PATENT DOCUMENTS 3003340  2/1993  WIPO ........................ 73/290 V

*Primary Examiner*—Elizabeth L. Dougherty

[57] ABSTRACT

An ultrasonic sensor for detecting the presence of a liquid having an elongated body of plastic material with spaced arms at one end defining an air gap between the arms with each arm having a piezoelectric element at its inner face. The body houses a circuit board on which components of an ultrasonic sensing circuit that reacts to produce a signal when liquid is present in the air gap. The body is small in dimensions and is flat making it easy to install into restricted space applications.

8 Claims, 2 Drawing Sheets

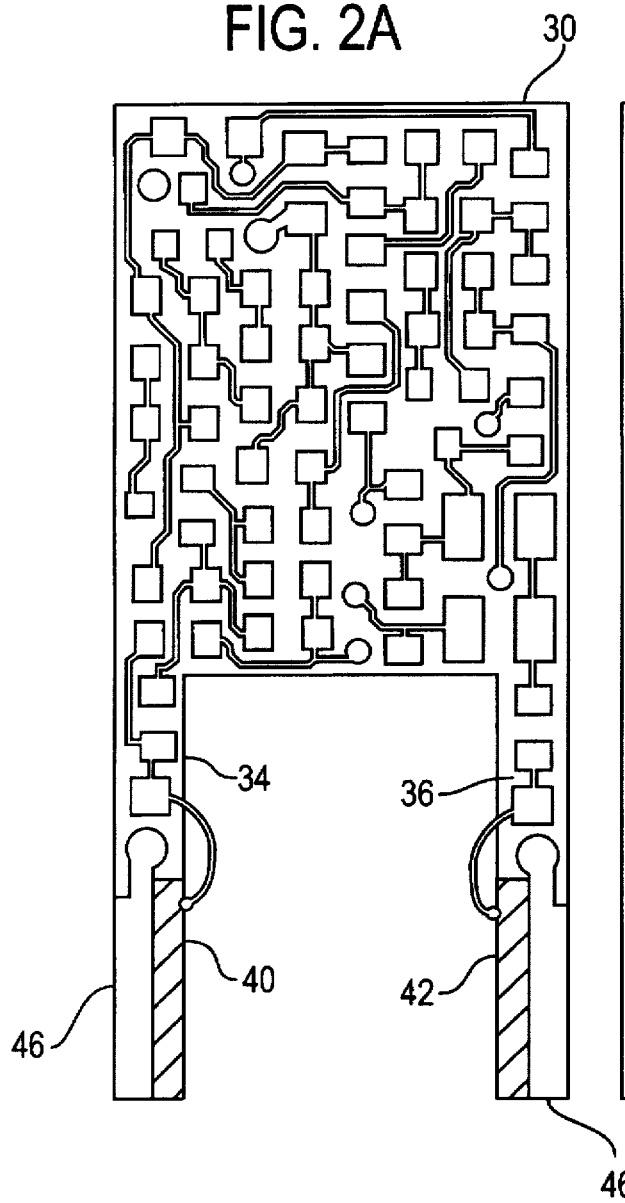
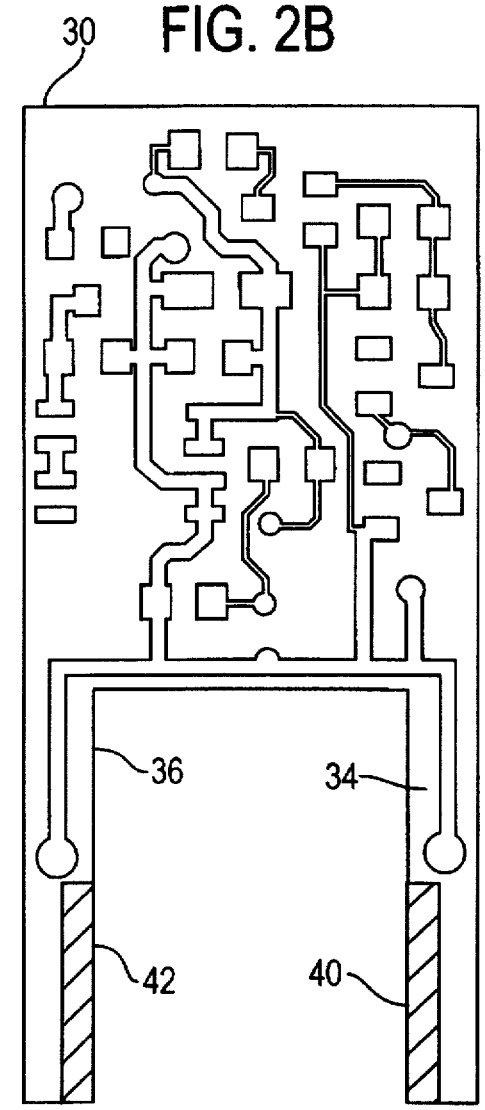
FIG. 2A   FIG. 2B
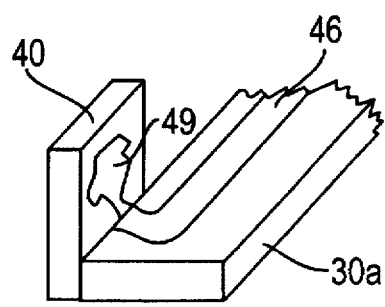
FIG. 3

ULTRASONIC MICRO-SENSOR FOR LEVEL LEAK ALERT AND INTERFACE DETECTOR

BACKGROUND OF THE INVENTION

Ultrasonic liquid level sensors are well known devices for detecting the presence of a liquid in a vessel or other type of space. One typical type of sensor utilizes a metal body constructed with an air gap section. An ultrasonic transmitting and receiving element, normally of piezoelectric material, is located in the body on each side of the air gap. The elements are connected in a circuit whose electronic components also can be located in the sensor body. The piezoelectric elements and circuit operate such that when there is no liquid present in the sensor gap the sensor has no output because ultrasonic energy cannot be transmitted through the air in the gap between the ultrasonic elements. When liquid is present in the gap the ultrasonic energy can be transmitted between the elements. In this case, the circuit produces an output indicating the presence of the liquid.

The housing bodies for such ultrasonic sensors are usually quite bulky in shape. A typical sensor body is made of metal and has a tubular member formed with the gap. The tubular member is often inserted through the wall of a vessel in which the presence of liquid is to be detected. Thus, the sensor serves as a point level detector. While such a type of sensor is operable, it has limitations with respect to its size and shape. For example, it cannot be used in restricted space applications, such as between the closely spaced walls of a double wall tank, to detect leakage. Also, such types of sensors are required to be fixed to a given location often requiring drilling of a mounting hole through the vessel wall. That is, such prior art senors are really not movable or portable.

A need exists to be able to sense liquid leakage in the space between the two walls of a double wall tank and other restricted locations. Recent types of fiberglass and steel double wall tanks have a space between the two walls as small as 0.50". In such a restricted space it is not possible to reliably measure the presence of leaking liquid with conventional types of ultrasonic sensors. Foe example, it is not possible to make such measurements with mechanical float switches, because of their large size. Capacitance type sensors cannot reliably detect a liquid having a low dielectric constant, such as gasoline, and cannot operate in a steel tank environment. While optical sensors can be made small enough to satisfy the requirement, the buildup of materials on the optics does not permit reliable operation

BRIEF DESCRIPTION OF THE INVENTION

The present invention relates to an ultrasonic sensor having a body which contains the active ultrasonic elements and associated electronic components and is small in size. In addition the body is of plastic material which is compatible with most liquids, including gasoline.

In accordance with the invention the sensor body is configured to have the air gap formed between extending arms at one end of the body and the active ultrasonic elements are mounted on opposite sides of the gap. The electronic circuit components are preferably surface mounted on a circuit board within the body resulting in a decreased body thickness. In a preferred embodiment the body is of elongated generally rectangular shape and has the air gap at one end of the body. The ultrasonic elements are of small size, have high gain and sensitivity and are mounted in a manner to achieve high sensitivity.

OBJECTS OF THE INVENTION

It is therefore an object of the present invention to provide a miniaturized ultrasonic sensor.

A further object is to provide an ultrasonic sensor in which all of the components are contained in a body of small size.

Yet another object is to provide an ultrasonic sensor having a plastic body with relatively small ultrasonic elements located at an end of the body that can be of plastic material.

BRIEF DESCRIPTION OF THE DRAWINGS

Other objects and advantages of the invention will become more apparent upon reference to the following specification and annexed drawings in which:

FIGS. 2A and 2B are plan views of opposite sides of the circuit board internal of the body and also showing the mounting of the ultrasonic elements;

FIG. 3 is a perspective view showing the mounting of a piezoelectric element.

DETAILED DESCRIPTION OF THE INVENTION

Figure 1A:
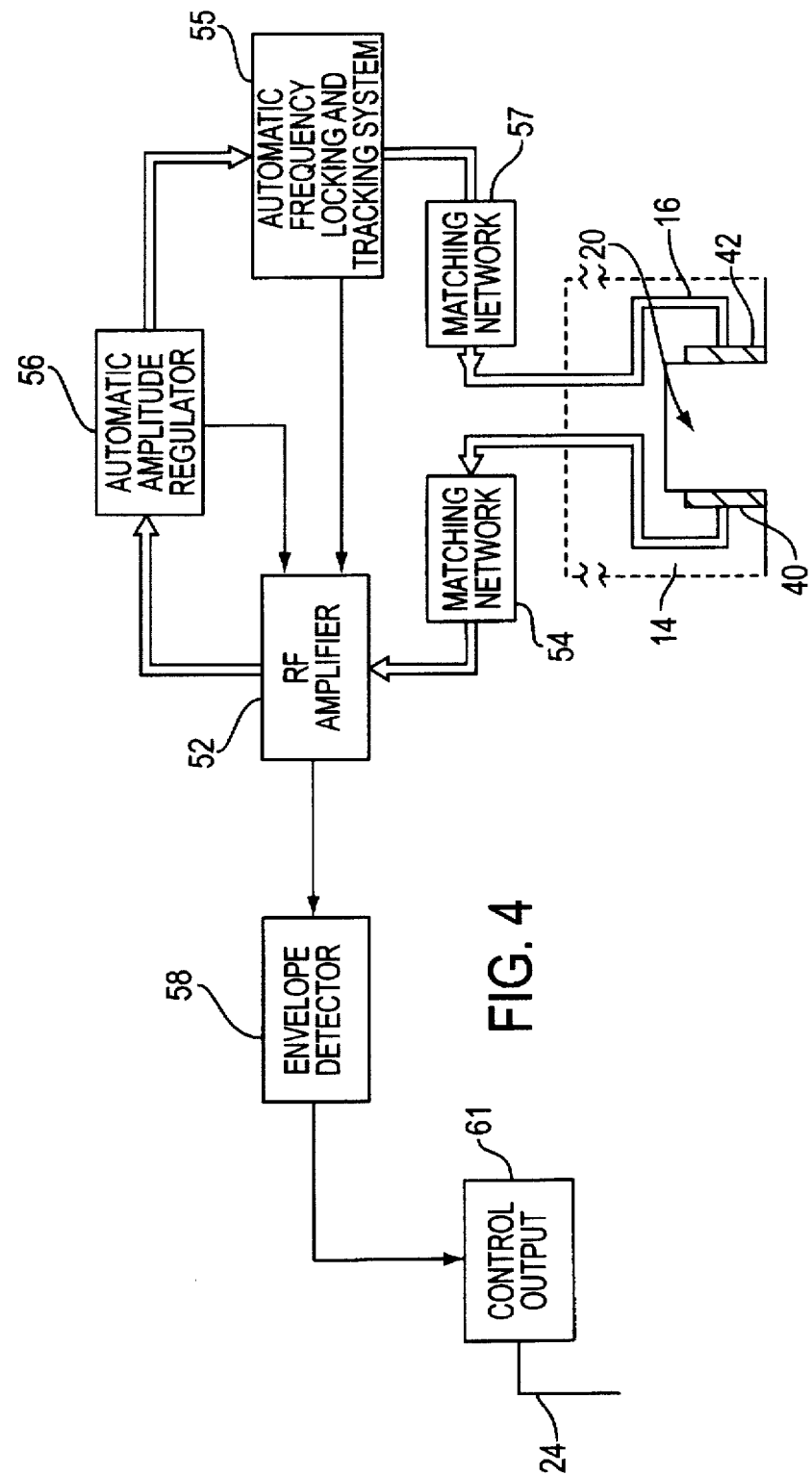
FIGS. 1A and 1B are top plan and side views of the sensor body.
Figure 1B:
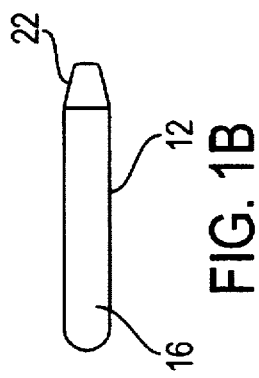

Referring to FIGS. 1A and 1B the sensor 10 has a body 12 of generally rectangular shape that is relatively thin and has flat upper and lower surfaces. One end of the body is bifurcated with branch arms 14, 16 that form an air gap 20 therebetween. As explained in detail below, a piezoelectric ultrasonic transmitting element is located within one of the arms and a comparable receiving element in the other arm. The other end 22 of the body is tapered inwardly from all of the body top, bottom and sides to form a somewhat conical shape. A cable 24 extends from the body end 22 to a remote location. The cable provides the sensor with the necessary operating voltages and provides the indication signals at such location indicating the absence or presence of liquid in gap 20.

The body 12 also contains all of the electronic components of the ultrasonic liquid detection circuit. This also is explained below. The body 12 can be made of any suitable material, with a stable and non-reactive plastic material such as KYNAR preferred that is compatible with organic liquids such as gasoline and oil and can withstand low temperatures. Typical dimensions for the body 12 are:

| overall length | 2.145" |
| length of arms | 0.560" |
| width of gap 20 | 0.375" |
| thickness of body | 0.375" |
| body width | 0.075" |

FIGS. 2A and 2B show the circuit board 30 located within body 12 on which the electronic components and the piezoelectric elements are mounted. The board is of generally rectangular shape and has branch arms 34 and 36 on each of which a respective piezoelectric element 40 and 42 is mounted. FIG. 2A shows the component side and FIG. 2B the solder side of the board. Although not shown, the electronic components, such as one or more integrated circuit chips, capacitors and resistors, are surface mounted on the board 30 (FIG. 2A). Surface mounting aids in minimizing the overall thickness of the sensor body 12.

The piezoelectric elements 40 and 42 are of a suitable material such as PZT having an operating frequency in the range of 1–3 Mhz. The dimensions of each of the elements 40, 42 is typically 0.25"×0.25". One of the elements operates as a transmitter and the other as a receiver. One side of each of the elements has a metallic electrode deposited on it for connection, such as by circuit board trace lead 46.

Proper mounting of tile elements 40, 42 is desired to increase the sensitivity of the sensor. To accomplish this, both sides of an element are freely coated with a suitable adhesive and, as shown in FIG. 3, the element 40 is mounted to the inner face of a branch 30a of tile circuit board 30 transverse to the plane of the board. The other element 42 is mounted to a similar branch of the board opposing branch 30a. The board branch 30a corresponds to one of the body branch arms 15. A piece of foam 49, such as conventional air cell plastic material, is fastened by the adhesive to the face of the element 40, 42 mounted to the circuit board branch 30a. The foam is relatively thin and is largely encompassed within the adhesive. The foam serves to enhance the response of the element and results in a high gain circuit with a high signal to noise ratio response even though the circuit electronic components are of small size.

The outer face of each element 40, 42, that is the face that faces the air gap 20 away from board 30, and the remainder of the board 30 are coated with the material of the body 12 to achieve the shape shown in FIGS. 1A and 1B.

Figure 4:
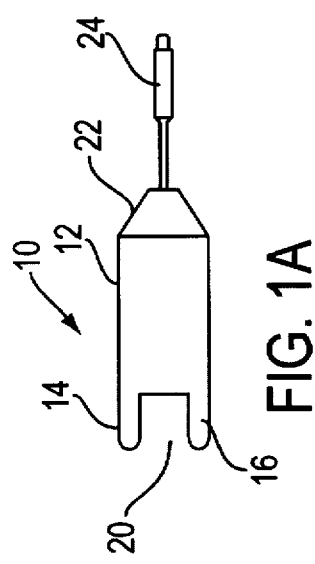
FIG. 4 is a schematic diagram of the ultrasonic liquid presence detecting circuit.

FIG. 4 is a schematic block diagram of the components on the board 30 that form the ultrasonic liquid detection circuit. These components are embedded within the housing 12. The electronics includes an oscillating loop type ultrasonic liquid presence detecting circuit. This has an amplifier 52, which can be a fairly high gain RF or video amplifier, whose input is connected to the receiver piezoelectric crystal element 40 through a matching network 54 that is formed of components such as capacitors and coils (not shown) to match the impedance of element 40.

The output of amplifier 52 is connected to the input of an automatic gain control circuit 56 which makes the output of the ultrasonic circuit of relatively constant amplitude. An envelope detector 58 is connected to the output of the amplifier 52 and its output is connected to a signal control output converter 61 which converts the signal level to a form which is usable by the remote monitoring system, e.g. the conventional 4-20 ma signal range as is used by many monitoring systems.

The transmitter ultrasonic crystal element 42 is connected to the output of the gain control circuit 26 through an automatic frequency tracking and locking circuit 55 and another matching network 52. The frequency tracking circuit 55 serves to compensate for change in density of liquid, temperature and mechanical variables which change the mechanical 'Q' of the circuit. The frequency tracker 55 indirectly changes the gain of the amplifier 52.

In operation of the ultrasonic circuit, when there is no liquid in the housing gap 20 between the two crystal elements 40, 42, the amplifier loop is quiescent since ultrasonic energy cannot be transmitted through the air across the gap between elements 40, 42. When liquid is present in the gap, ultrasonic energy at a frequency determined by the characteristics of the crystal elements 40, 42 is transmitted across the gap between the elements and the loop is completed. The gain of amplifier 52 is greater than one and the circuit will begin to oscillate. This is detected by envelope detector 58 and an output signal is produced which actuates the signal converter 61 to send a signal indicating the presence of a liquid sensed over cable 24 to the remote monitor.

The sensor of the invention has a number of advantages. It is of small size and can fit into openings as small as 1' in diameter. This makes it ideal for sensing applications such as contained risers and the interstitial space of a double wall tank either in below ground or above ground applications. As can be seen, the sensor does not require a fixed mounting. Since it is light in weight it can be suspended by the cable into the sensing location, such as a tank. It is preferred that the cable 24 be relatively stiff. This permits the sensor to be pushed into tight locations and moved around in the location as desired. Since the sensor body is small in size it can be moved into and through non-linear paths such as between the walls of a curved tank. Also, the plastic body 12 permits use of the sensor in harsh chemical liquid environments. Since the body is relatively flat, it can be laid on a flat surface, such as a floor, to detect the presence of a liquid. Also, it can float on the surface of a body of liquid and the electronics configured to serve as an interface detector. That is, the sensor will not respond to the liquid on which it floats but will respond when a different type of liquid with different dielectric characteristics floats on the first liquid.

I claim:

1. An ultrasonic sensor comprising:

an elongated, generally flat, one piece, integral body of plastic material of generally rectangular shape having a width greater than its thickness and less than its length and having spaced arms at one end of the body along its length forming a gap between the opposing faces of the arms;

a piezoelectric ultrasonic element in each arm and opposing each other across the gap; and circuit means including at least one electronic component mounted within said plastic body connected to said elements for forming a circuit to produce a first type of signal when liquid is present in the gap between said spaced arms.

2. An ultrasonic sensor as in claim 1 wherein said circuit means includes a circuit board for mounting of said at least one electronic component.

3. An ultrasonic sensor as in claim 1 wherein said elongated body has flat upper and lower faces.

4. An ultrasonic sensor comprising:

an elongated, generally flat, one piece, integral body of plastic material of generally rectangular shape having a width greater than its thickness and less than its length and having spaced arms at one end and forming a gap therebetween;

a piezoelectric ultrasonic element at the inner face of each arm; and circuit means within said body connected to said elements to produce a first type of signal when liquid is present in the gap between said spaced arms, said circuit means including a circuit board for mounting of electronic components having a pair of branches, each branch comprising a part of a respective said arm of said body and having a said element mounted thereon.

5. An ultrasonic sensor as in claim 4 wherein each said element has opposing flat faces and a piece of foam is attached to one of said faces of a said element.

6. An ultrasonic sensor as in claim 5 wherein said circuit board and its branches are generally planar and each of said elements is mounted transverse to the plane of said circuit board on an inner edge of a respective board branch.

7. An ultrasonic sensor as in claim 6 wherein the foam is mounted to the face of the respective element which faces said circuit board.

8. An ultrasonic sensor as in claim 3, further comprising a cable extending from the end of said body remote from said arms and including at least one lead within said body connected to said circuit means.

* * * * *